United States Patent
Uesaka et al.

(10) Patent No.: US 9,623,896 B2
(45) Date of Patent: Apr. 18, 2017

(54) STEERING COLUMN DEVICE FOR ABSORBING IMPACT ENERGY

(71) Applicant: FUJI KIKO Co., Ltd., Kosai-shi, Shizuoka (JP)

(72) Inventors: Yota Uesaka, Shizuoka (JP); Takuya Adachi, Shizuoka (JP)

(73) Assignee: FUJI KIKO Co., Ltd., Shizuoka (JP)

( * ) Notice: Subject to any disclaimer, the term of this patent is extended or adjusted under 35 U.S.C. 154(b) by 0 days.

(21) Appl. No.: 15/062,248

(22) Filed: Mar. 7, 2016

(65) Prior Publication Data

US 2016/0280247 A1    Sep. 29, 2016

(30) Foreign Application Priority Data

Mar. 27, 2015  (JP) ................ 2015-065810

(51) Int. Cl.
  *B62D 1/19*    (2006.01)
  *B62D 1/184*   (2006.01)

(52) U.S. Cl.
  CPC ............ *B62D 1/195* (2013.01); *B62D 1/184* (2013.01)

(58) Field of Classification Search
  CPC .................... B62D 1/195; B62D 1/184
  See application file for complete search history.

(56) References Cited

U.S. PATENT DOCUMENTS

| | | | | |
|---|---|---|---|---|
| 4,240,305 A * | 12/1980 | Denaldi | ............... | B62D 1/184 403/59 |
| 4,244,237 A * | 1/1981 | Sprunger | ............... | B62D 1/184 403/96 |
| 5,361,646 A * | 11/1994 | Venable | ............... | B62D 1/184 74/493 |
| 5,570,610 A * | 11/1996 | Cymbal | ............... | B62D 1/184 74/493 |
| 5,606,891 A * | 3/1997 | Tisell | ............... | B62D 1/184 280/775 |
| 5,655,413 A * | 8/1997 | Barton | ............... | B62D 1/184 74/493 |

(Continued)

FOREIGN PATENT DOCUMENTS

| | | |
|---|---|---|
| EP | 1762462 A1 | 3/2007 |
| EP | 2674347 A2 | 12/2013 |
| WO | 2012/000593 A1 | 1/2012 |

OTHER PUBLICATIONS

Extended European search report issued on Aug. 12, 2016 in the counterpart European patent application.

*Primary Examiner* — Paul N Dickson
*Assistant Examiner* — Timothy Wilhelm
(74) *Attorney, Agent, or Firm* — Mots Law, PLLC (57) ABSTRACT

In a steering column device, a small-diameter part of an operating shaft on one side of a step part on the operating shaft between a pair of clamp parts penetrates through an impact absorbing slot along a laminating direction. By operating an operating lever, the dimension of cam mechanism in the direction of the operating shaft is increased. Consequently, between the step part and an inner face of the other clamp part, a movable-side friction plate is brought into pressure contact with a stationary-side friction plate to be held. In this situation, when a load exceeding a set value is applied to the steering column device, the movable-side friction plate slides on the stationary-side friction plate to absorb the impact.

3 Claims, 5 Drawing Sheets

(56) References Cited

U.S. PATENT DOCUMENTS

| | | | | |
|---|---|---|---|---|
| 5,787,759 | A * | 8/1998 | Olgren | B62D 1/184 280/777 |
| 5,941,129 | A * | 8/1999 | Anspaugh | B62D 1/184 74/493 |
| 5,979,938 | A * | 11/1999 | Menjak | B62D 1/184 280/775 |
| 6,450,531 | B1 * | 9/2002 | Rinker | B62D 1/184 280/775 |
| 6,848,716 | B2 * | 2/2005 | Lutz | B62D 1/184 280/775 |
| 6,902,192 | B2 * | 6/2005 | Sato | B62D 1/184 280/775 |
| 7,010,996 | B2 * | 3/2006 | Schick | B62D 1/184 280/775 |
| 7,178,832 | B2 * | 2/2007 | Ohtsu | B62D 1/184 280/775 |
| 7,219,926 | B2 * | 5/2007 | Ikeda | B62D 1/187 280/775 |
| 7,322,608 | B2 * | 1/2008 | Yamamoto | B62D 1/184 280/775 |
| 7,338,079 | B2 * | 3/2008 | Yamamoto | B62D 1/184 280/775 |
| 7,469,616 | B2 * | 12/2008 | Fujiu | B62D 1/184 74/493 |
| 7,699,344 | B2 * | 4/2010 | Moriyama | B62D 1/184 280/775 |
| 7,735,391 | B2 * | 6/2010 | Osawa | B62D 1/184 280/775 |
| 7,882,761 | B2 * | 2/2011 | Cymbal | B62D 1/184 280/775 |
| 8,590,933 | B2 * | 11/2013 | Narita | B62D 1/184 280/777 |
| 8,678,437 | B2 * | 3/2014 | Narita | B62D 1/184 188/371 |
| 8,931,364 | B2 * | 1/2015 | Hirooka | B62D 1/184 280/775 |
| 9,187,116 | B2 * | 11/2015 | Yokota | B62D 1/192 |
| 9,242,667 | B2 * | 1/2016 | Yoshihara | B62D 1/184 |
| 9,283,984 | B2 * | 3/2016 | Matsuno | B62D 1/187 |
| 2007/0068311 | A1 * | 3/2007 | Shimoda | B62D 1/195 74/493 |
| 2009/0173179 | A1 * | 7/2009 | Cymbal | B62D 1/184 74/493 |
| 2010/0294072 | A1 | 11/2010 | Ishii et al. | |
| 2013/0042716 | A1 * | 2/2013 | Davies | B62D 1/195 74/493 |
| 2016/0144886 | A1 * | 5/2016 | Tomiyama | B62D 1/187 74/493 |

* cited by examiner

STEERING COLUMN DEVICE FOR ABSORBING IMPACT ENERGY

TECHNICAL FIELD

The present disclosure relates to a steering column device that allows a column to contract together with a steering shaft due to an impact load at a secondary collision of an impact accident, thereby absorbing impact energy.

BACKGROUND ART

Figure 1:
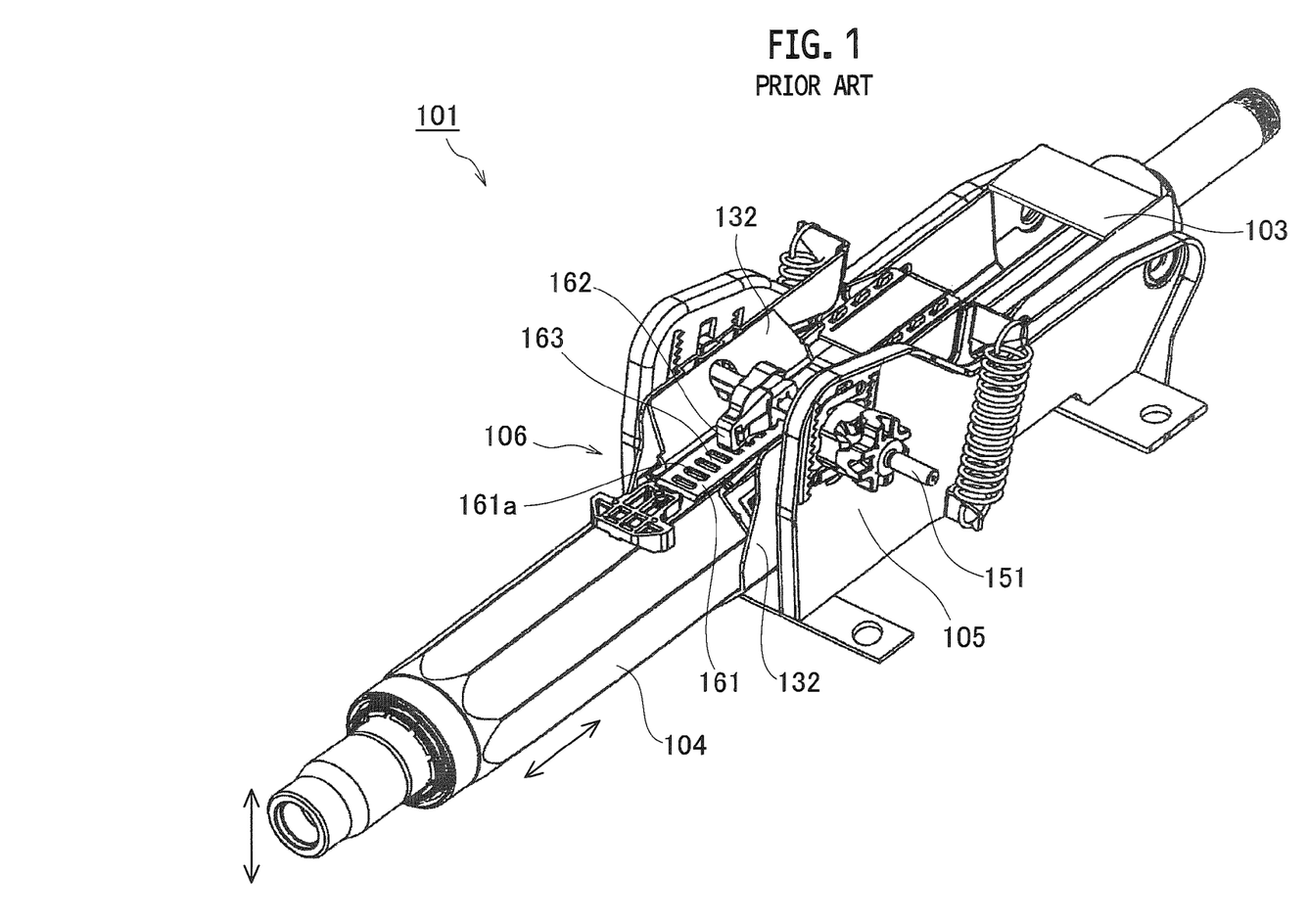
FIG. 1 is a perspective view showing a conventional device.
Figure 2:
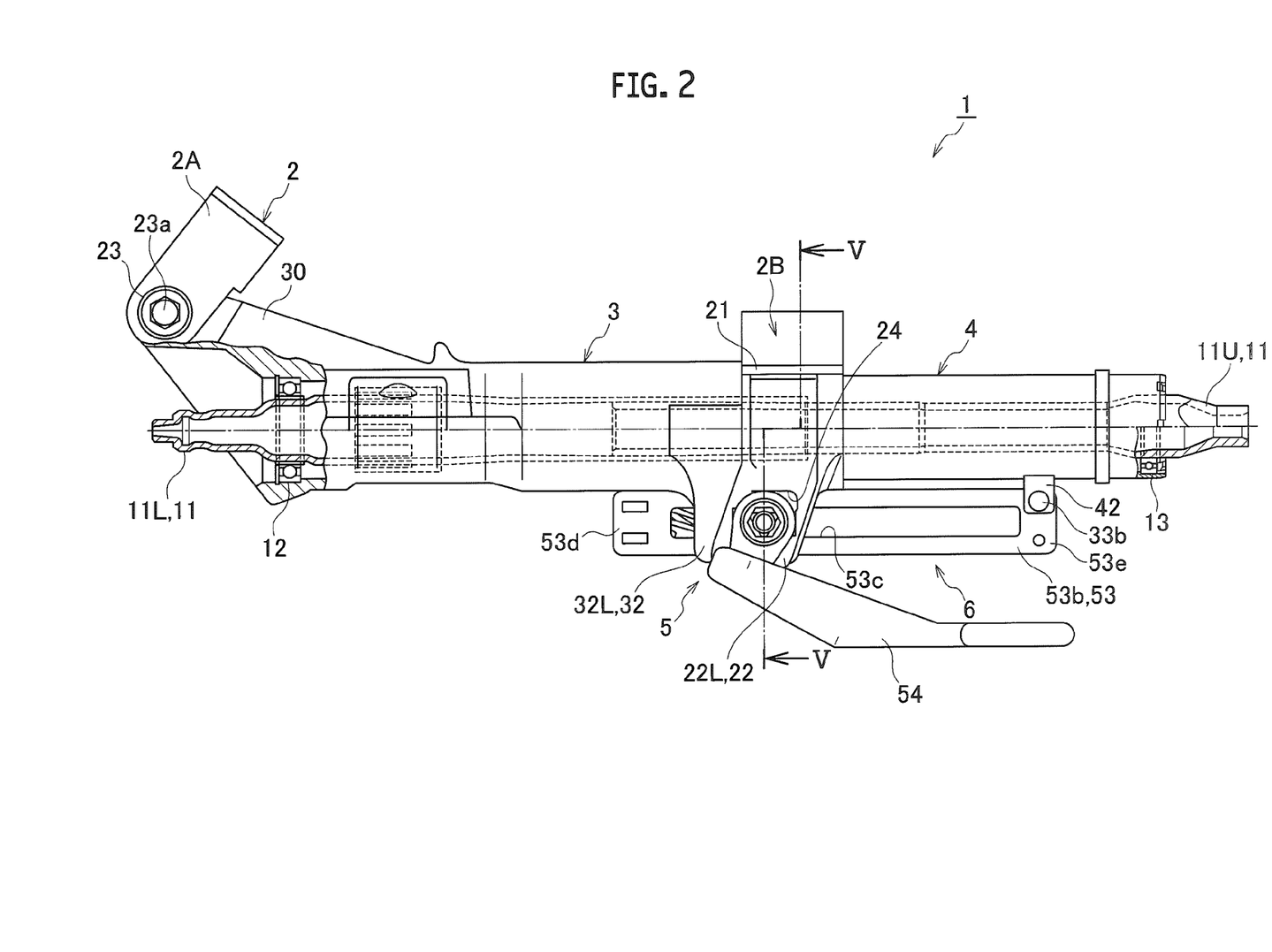
FIG. 2 is a left side view showing an embodiment of the present invention.
Figure 3:
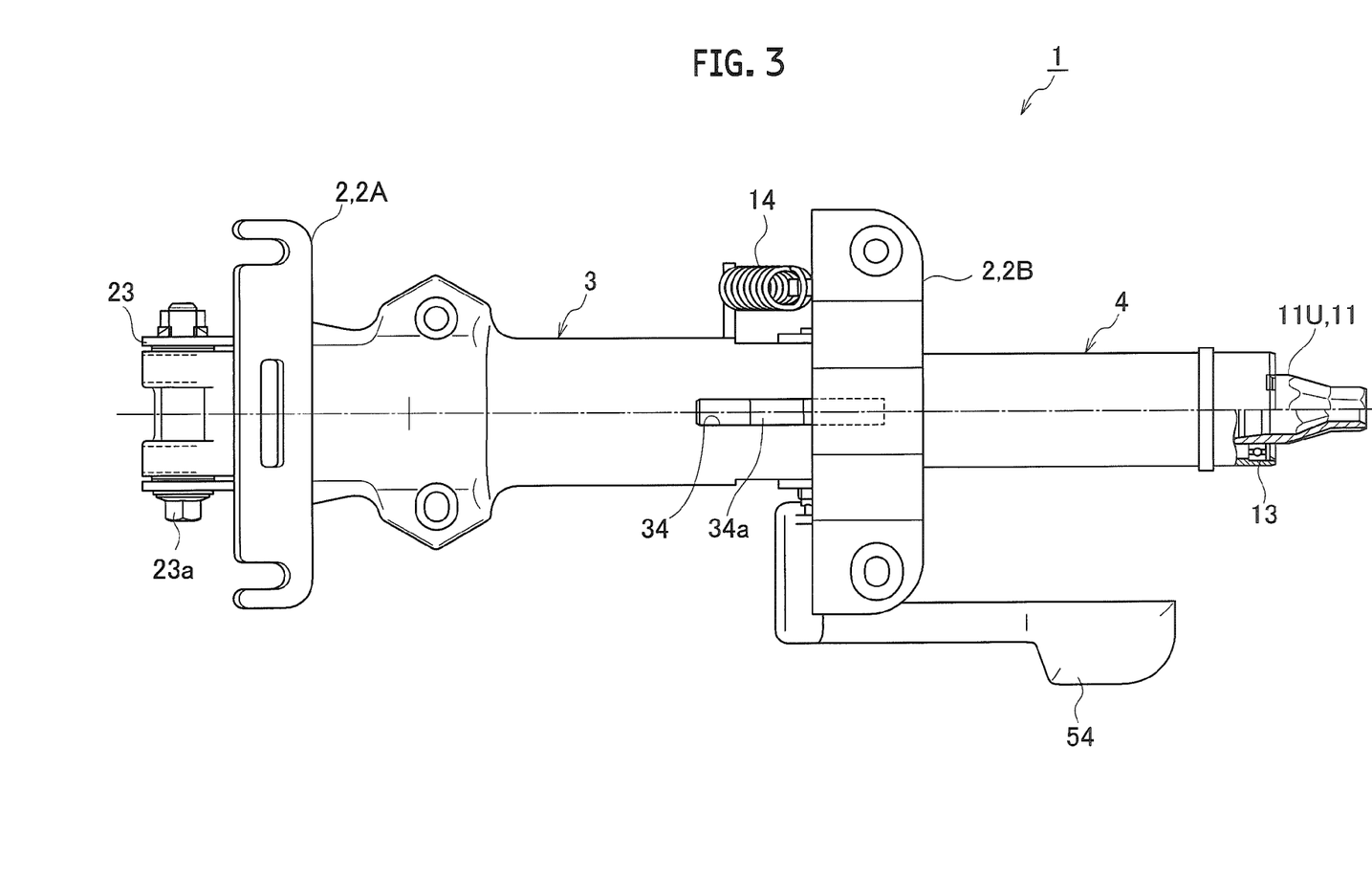
FIG. 3 is a plan view showing the embodiment of the present invention.
Figure 4:
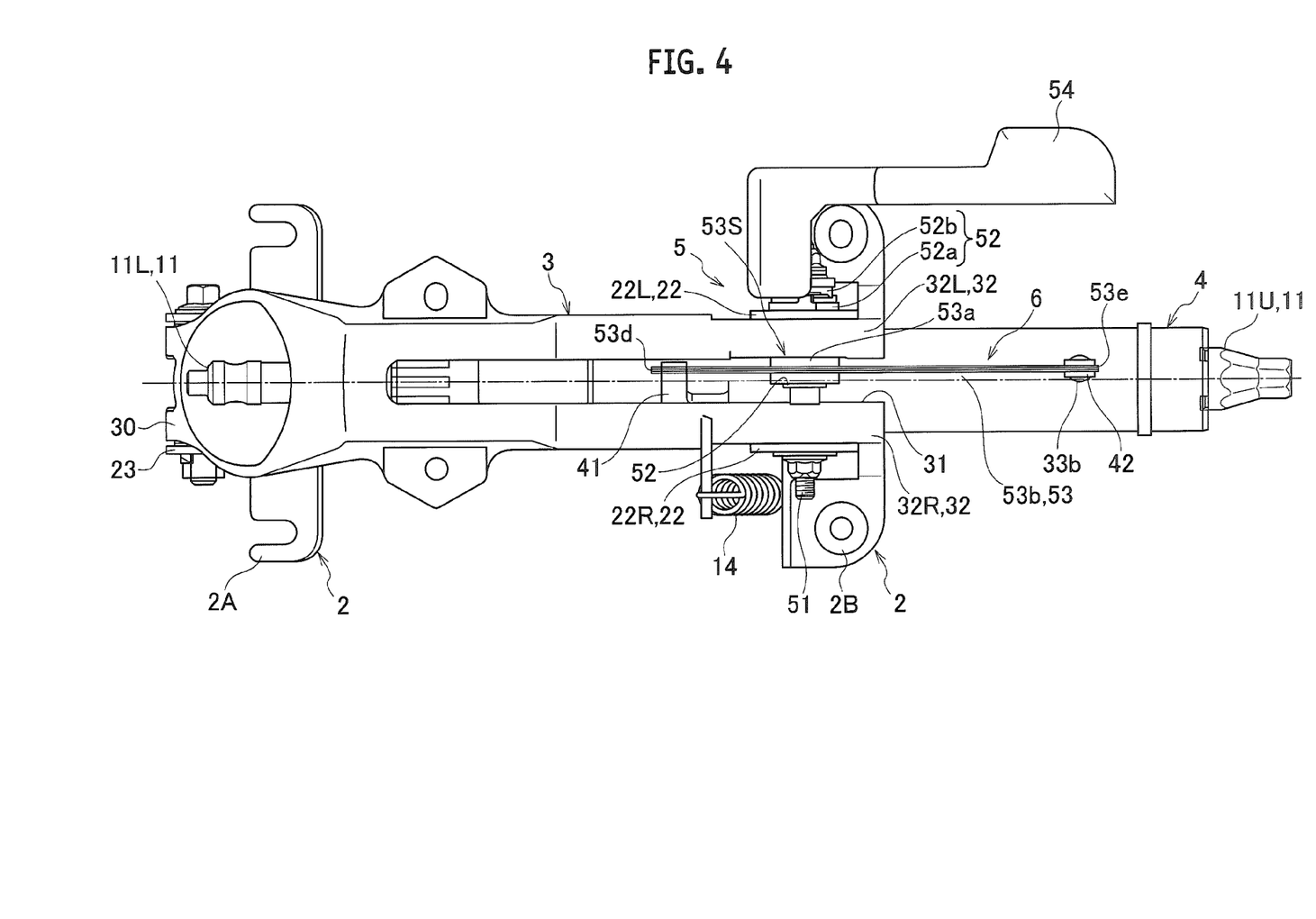
FIG. 4 is a bottom view showing the embodiment of the present invention.

As shown in FIG. 1, a steering column device 101 of WO2012/000593A1 includes an outer column 103 fixed to the side of a vehicle body. Into this outer column 103, a cylinder-shaped inner column 104 is inserted so as to be movable in the longitudinal direction of a vehicle. Fastening mechanism 105 is provided to fasten this inner column 104 to the outer column 103. Impact absorbing mechanism 106 is provided to absorb impact energy when an impact accident causes a secondary collision where a passenger collides with a steering wheel.

The fastening mechanism 105 includes a pair of clamp parts 132 which stand from the outer column 103 so as to interpose the inner column 104 therebetween. An operating shaft 151 penetrates through the pair of clamp parts 132. The inner plate 104 is provided with a lock plate 161 extending along the direction of a cylinder axis. The lock plate 161 is in the form of a ladder where multiple lock holes 161 are formed in a belt-shaped member successively in the longitudinal direction. A lock claw 162 is arranged on the operating shaft 151. By rotationally operating the operating shaft 105 about its axis, the lock claw 162 is detachably engaged with the lock holes 161a. The lock plate 161 is retained in an arbitrary position since the lock claw 162 is engaged with a bar 163 dividing the adjoining lock holes 161a.

When the inner column 104 moves forward due to a collision with a passenger, the impact absorbing mechanism 106 absorbs impact energy since an energy absorbing member arranged between the inner column 104 and the lock plate 161 retained in the arbitrary position is bent as if it were drawn.

SUMMARY OF THE DISCLOSURE

In the fastening mechanism 105, meanwhile, when the inner column 104 is positioned in a position where the lock claw 162 overlaps the bar 163, the lock claw 162 is urged against the lock hole 161 a under condition of running on the bar 163. Thus, if an impact load is applied on the inner column 104 under condition that the lock claw 162 is running on the bar 163, there is produced a free running zone making it impossible to absorb the impact energy since the lock claw 162 moves forward together with the inner column 104 until the claw 162 is engaged with the adjoining bar 163.

In consideration of the above-mentioned situation, an object of the present invention is to provide a steering column device capable of absorbing impact energy from a time immediately after an impact is applied to an inner column without producing a free running zone.

A first aspect of the present invention provides a steering column device comprising: an outer column having a cylindrical shape and arranged along a vehicle longitudinal direction; a slit formed to penetrate through a cylindrical wall of the outer column along a cylinder-axis direction of the outer column; first and second clamp parts arranged on both edge parts of the slit along the cylinder-axis direction; an inner column having a cylindrical shape and inserted into the outer column so as to be movable in the cylinder-axis direction; an operating shaft having a shaft-shape and arranged so as to penetrate through the first and second clamp parts while engaging one end of the operating shaft with an outer face of the first clamp part, the operating shaft comprising a large-diameter shaft portion positioned on the side of the first clamp part, a small-diameter shaft portion having a diameter smaller than a diameter of the large-diameter shaft portion and positioned on the side of the second clamp part and a step part interposed between the large-diameter shaft portion and the small-diameter shaft portion and arranged between the first clamp part and the second clamp part; an operating lever arranged on a shaft portion of the operating shaft positioned on the side of an outer face of the second clamp part; cam mechanism that allows a dimension thereof in the direction of the operating shaft to be increased by rotating the operating shaft about an axis thereof to a fastening direction, thereby reducing an interval between the first clamp part and the second clamp part, contracting the diameter of the outer column and bringing the outer column into pressure contact with the inner column; and frictional lock mechanism having a laminated body in which a movable-side friction plate including a plate member having an impact absorbing slot opening along the cylinder-axis direction and arranged on the side of the inner column and a stationary-side friction plate including a plate member and arranged on the side of the outer column are laminated on each other, the impact absorbing slot being penetrated by the small-diameter shaft portion of the operating shaft along the laminating direction, wherein, between the step part and the second clamp part, the movable-side friction plate is brought into pressure contact with the stationary-side friction plate to be held since the dimension of the cam mechanism in the direction of the operating shaft is increased to move the operating shaft toward the cam mechanism, and when a load exceeding a set value is applied to the inner column under condition that the movable-side friction plate is brought into pressure contact with the stationary-side friction plate to be held, the movable-side friction plate slides on the stationary-side friction plate, thereby absorbing impact energy.

In the steering column device described above, the slit may be formed so as to extend from a rear edge of the outer column up to an outer column's part corresponding to the front end of the inner column, which has been inserted into the outer column through a rear end thereof, under condition that the inner column is shrunk to the utmost extent after absorbing impact energy.

In the steering column device described above, one of the outer column and the inner column may be provided with an engagement slot whose longitudinal dimension is set smaller than the longitudinal dimension of the impact absorbing slot, and the other of the outer column and the inner column may be provided with a stopper which is inserted and fitted to the engagement slot movably in a longitudinal direction thereof and which is established so as to fracture when a shear load exceeding a set value is applied to the stopper.

According to the first aspect mentioned above, by using the frictional lock mechanism which fastens the inner column to the outer column owing to frictional force between the movable-side friction plate and the stationary-side friction plate and which absorbs the impact energy, it is possible to absorb the impact energy from a time immediately after the impact energy is applied to the inner column, without producing a free running zone.

As the frictional force between the outer column and the inner column can be increased by providing the frictional lock mechanism, it is possible to fasten the inner column to the outer column with a small operating force.

Further, when cancelling the fastening state, the outer column is elastically restored to expand the interval between the pair of clamp parts and simultaneously, the clearance between the movable-side friction plate and the stationary-side friction plate is ensured. As a result, it is possible to suppress the frictional resistance which would be produced when cancelling the fastening state to execute the adjustment of the telescopic position of the inner column and therefore, it is possible to exhibit superior operability.

In case that the slit extends up to an outer column's part corresponding to the front end of the inner column under condition that the inner column is shrunk to the utmost extent after absorbing impact energy, it is possible to contract the diameter of the outer column with a small operating force while allowing the outer column to have enough rigidity for the movement of the inner column in the cylinder-axis direction.

In case of providing the telescopic slot and the stopper, while adjusting the position of the inner column within the adjustment range of the telescopic position during the normal state, the impact energy can be absorbed by the fracture of the stopper at the impact absorption.

DESCRIPTION OF THE EMBODIMENT

An embodiment of the present invention will be described with reference to the accompanying drawings. As shown in FIGS. 2 to 5, this embodiment relates to a manual type steering column device 1. The steering column device 1 of this embodiment includes an attachment bracket 2 for fixing the device 1 to a vehicle body. An outer column 3 is supported relative to this attachment bracket 2 so as to be pivotable (capable of adjusting its tilt position) in a vehicle vertical direction. An inner column 4 is supported relative to the outer column 3 so as to be movable (capable of adjusting its telescopic position) in a vehicle longitudinal direction. The steering column device 1 is provided with fastening mechanism 5 which fastens the attachment bracket 2, the outer column 3 and the inner column 4 integrally. The steering column device 1 further includes impact absorbing mechanism 6 for absorbing impact energy applied to the inner column 4.

The attachment bracket 2 includes a front-side fixing part 2A fixed to a ceiling plane (not shown) of a vehicle body, a rear-side fixing part 2B and a pair of hanging parts 22 hanging from left and right marginal parts 21. The front-side fixing part 2A is provided, at its front end portion, with a pivot part 23 which journals the outer column 3 swingably.

The pair of hanging parts 22 have tilt slots 24 opened to define the adjustment range of a tilt position along the vehicle vertical direction (tilting direction). The tilt slots 24 are composed of arcuate slots centered on the pivot part 23.

The outer column 3 has a cylindrical shape and is arranged between the pair of hanging parts 22 to extend along the vehicle longitudinal direction. The outer column 3 is provided, at its upper marginal portion on the front-end side, with a pivot receiving part 30. Since the pivot receiving part 30 is pivotally supported by the pivot part 23 of the attachment bracket 2 through a bolt 23a, the rear-end side of the outer column 3 swings in the vehicle vertical direction.

Additionally, the outer column 3 is provided with a slit 31 which penetrates through the lower face of a cylinder wall 3a and extends from a rear edge of the outer column 3 along a cylinder-axis direction. The dimension of the slit 31 in the cylinder axis is established so that the slit 31 extends from the outer column's rear edge up to an outer column's part corresponding to the front end of the inner column 4 under condition that the inner column 4 inserted into the outer column 3 through its rear end is shrunk to the utmost extent after absorbing impact energy.

Further, a pair of clamp parts 32 (first and second clamp parts) are formed so as to stand on both marginal parts of the slit 31 along the cylinder-axis direction. The pair of clamp parts 32 are positioned on the rear-end side of the slit 31 and formed to stand on outer-column's portions opposed to respective inner faces of the hanging parts 22 along the vehicle vertical direction.

Additionally, the outer column 3 is provided, in its ceiling portion, with an engagement slot 34 which penetrates through the cylinder wall 3a and extends along the cylinder-axis direction.

The inner column 4, which has a cylindrical shape, is inserted into the cylindrical outer column 3 so as to be movable in the outer column 3 in the cylinder-axis direction. Incidentally, in the cylindrical inner column 4 and the cylindrical outer column 3, a steering shaft 11 is supported so as to be rotatable in these columns 4, 3. The steering shaft 11 comprises a lower shaft 11L rotatably supported in the outer column 3 and an upper shaft 11U rotatably supported in the inner column 4. The upper shaft 11U and the lower shaft 11L are spline-connected to each other. The upper shaft 11U and the lower shaft 11L are adapted so as to rotate around the axis integrally. The upper shaft 11U is adapted so as to be movable to the lower shaft 11L in the axial direction.

Further, the inner column 4 has a stopper 34a formed to project from an outer circumferential face of the column 4. The stopper 34a is inserted and fitted into the engagement slot 34 so as to be movable therein in the longitudinal direction. The stopper 34a is also established so as to fracture when a shear load exceeding a set value is applied to the stopper 34a. Then, when performing the telescopic-position adjustment with the movement of the inner column 4 in the cylinder-axis direction, the adjustable range of the telescopic position is defined with the movement of the stopper 34a in the engagement slot 34.

The fastening mechanism 5 comprises an operating shaft 51, cam mechanism 52 and frictional lock mechanism 53.

Figure 5:
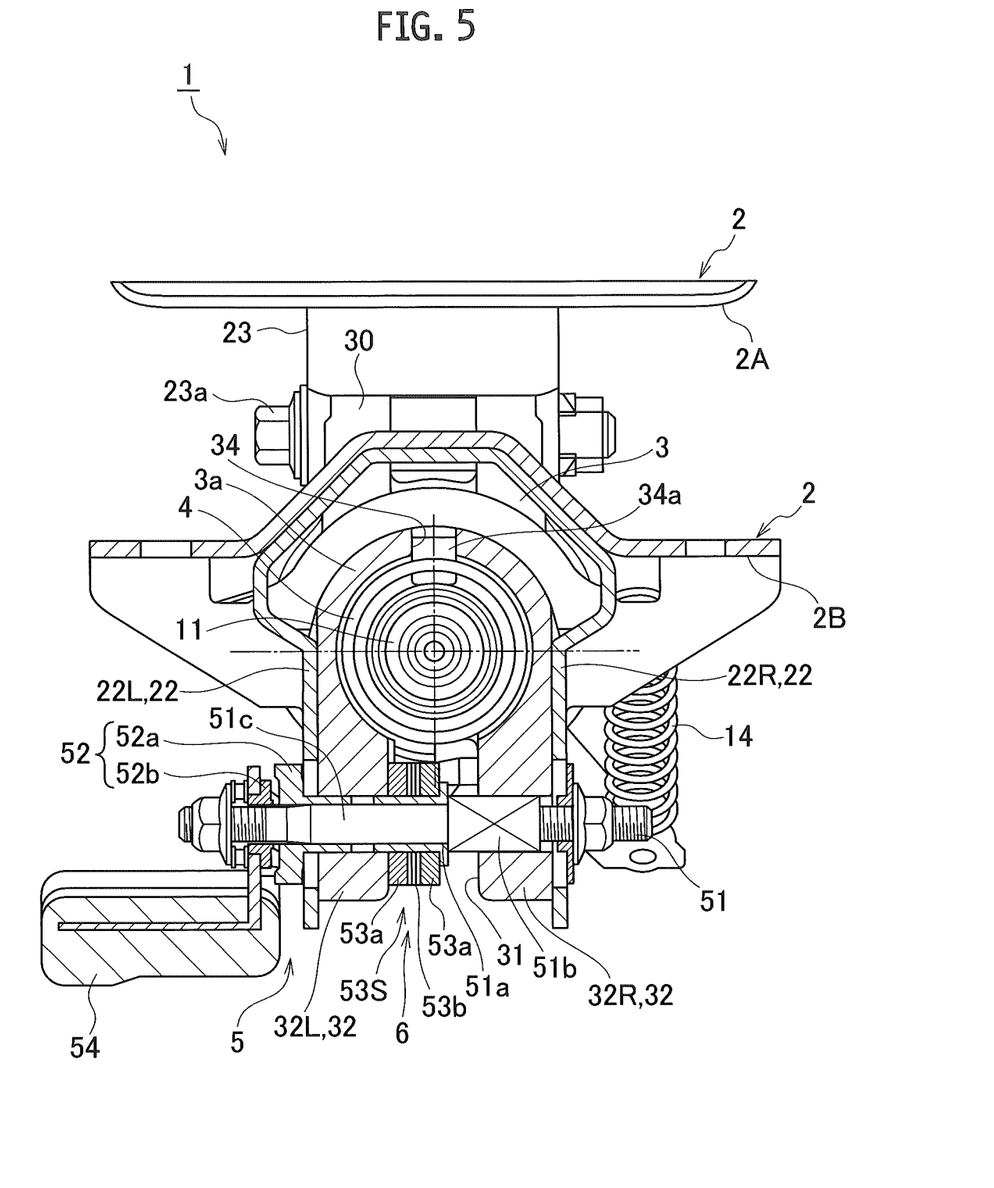
FIG. 5 is a sectional view taken along a line V-V of FIG. 2.

The operating shaft 51 is in the form of a stepped shaft comprising a large-diameter shaft portion 51b, a small-diameter shaft portion 51c having a diameter smaller than a diameter of the large-diameter shaft portion and a step part 51a interposed between the large-diameter shaft portion 51b and the small-diameter shaft portion 51c. The operating shaft 51 is arranged so as to extend along a vehicle width direction and penetrates through the tilt slots 24 of the hanging parts 22 in pairs and the clamp parts 32 in pairs of the outer column 3. In the operating shaft 51, the large-diameter shaft portion 51*b* is shaped with a rectangular cross section (here, square cross section) so as not to rotate around an axis of the shaft. The large-diameter shaft portion 51*b* is also engaged with a rectangular hole of the right-side clamp part 32R. A washer engaging with the outer face of the right-side clamp part 32R is fixed to one end of the operating shaft 51 on one-end side by a nut, while the other end of the shaft 51 on another-end side, which projects from the left-side hanging part 22L outwardly, is equipped with the cam mechanism 52 and an operating lever 54. That is, the end of the operating shaft 51 on the on-end side engages with the outer face of the right-side clamp part 32R as one clamp part. Further, the cam mechanism 52 is disposed on a portion of the operating shaft 51, which is positioned between the operating lever 54 and the left-side hanging part 22L. That is, the cam mechanism 52 is arranged on the outer-face side of the left-side clamp part 32L as the other clamp part.

The cam mechanism 52 is composed of a stationary cam 52*a* and a rotational cam 52*b*.

The stationary cam 52*a* is formed with a wide circular shape. The operating shaft 51 is arranged so as to penetrate through the center of the wide circular shape. The stationary cam 52*a* is arranged so that its stationary cam face faces the side of the operating lever 54. With the back side of the stationary cam face fitted into the tilt slot 24, additionally, the stationary cam 52 is arranged so as to be vertically movable in the tilt slot 24 without being rotated around the operating shaft 51. On the stationary cam face, crest parts and trough parts are formed in the circumferential direction alternately.

The rotational cam 52*b* is joined to the operating lever 54 integrally and formed with a wide circular shape. The operating shaft 51 is also arranged so as to penetrate through the center of the wide circular shape. The rotational cam 52*b* is arranged so that its rotational cam face faces the stationary cam face. Additionally, a nut is thread engaged with an end of the operating shaft 51 penetrating through the rotational cam 52*b*, through a thrust bearing. The rotational cam 52*b* is assembled to the operating shaft 51 so as to rotate around the operating shaft 51. On the rotational cam face, crest parts and trough parts are formed in the circumferential direction alternately. Note that locking nuts are used as the nuts to be thread engaged with both ends of the operating shaft 51.

Then, in the cam mechanism 52, when the crest parts of the stationary cam 52*a* are overlaid on the crest parts of the rotational cam 52*b*, the axial dimension of the stationary cam 52*a* and the rotational cam 52*b* in combination is expanded. Consequently, the interval between the pair of hanging parts 22*l* and 22R is narrowed to reduce the diameter of the outer column 3, so that the inner circumferential face of the outer column 3 is press-contacted and fastened to the outer circumferential face of the inner column 4. In the cam mechanism 52, meanwhile, when the crest parts of the stationary cam 52*a* are overlaid on the trough parts of the rotational cam 52*b*, the axial dimension of the cam mechanism 52 is narrowed. Consequently, the interval between the pair of hanging parts 22*l* and 22R is expanded to loosen the operating shaft 51, so that the inner column 4 becomes movable to the outer column 3 in the cylinder-axis direction.

The frictional lock mechanism 53 is composed of a laminated body 53*s* in which a stationary-side friction plate(s) 53*a* and a movable-side friction plate(s) 53*b*, both of which are in the form of plate-dike members together, are laminated alternately. Additionally, the frictional lock mechanism 53 is arranged in a region corresponding to the slit 31 between the clamp parts 32 so that the shaft portion adjacent to the step part 51 and having a smaller diameter penetrates through the laminated body 53*s* in the laminating direction. Note that the stationary-side friction plates 53*a* are laminated on the outermost sides of the laminated body 53*s*. Again, respective numbers of the movable-side friction plate(s) 53*b* and the stationary-side friction plates 52*a* are established in accordance with a set operating force of the operating lever, a fastening force of the fastening mechanism 5 to be set between the inner column 4 and the outer column 3 and an impact absorbing load.

The stationary-side friction plate 53*a* is formed by a thin plate having a wide annular shape like a washer. The stationary-side friction plate 53*a* is provided with a center hole through which the operating shaft 51 penetrates, and also arranged on the outer column 3 through the operating shaft 51.

The movable-side friction plate 53*b* is formed by a thin plate having an oblong frame-shape elongated in the vehicle longitudinal direction. The movable-side friction plate 53*b* has an impact-absorbing slot 53*c* formed so as to open along the cylinder-axis direction. The operating shaft 51 penetrates through the impact-absorbing slot 53*c* so as to be movable in the longitudinal direction of the hole 53*c*. In connection, a flanged cylindrical collar made of resin is fitted onto the small-diameter part of the operating shaft 51. This flanged cylindrical collar prevents an occurrence of metallic hitting sound which would be caused by direct contact of respective inner faces of the center holes of the stationary-side friction plates 53*a* and the impact-absorbing slots 53*c* of the movable-side friction plates 53*b* with the operating shaft 51. In the movable-side friction plate 53*b*, additionally, its front short-side frame part 53*d* is supported by a front support member 41. In the movable-side friction plate 53*b*, its rear short-side frame part 53*e* is supported by a rear support member 42 through a support pin 33*b*. Note that the front support member 41 is positioned in the slit 31 and also formed so as to extend from a lower marginal portion forming an outer circumferential part of the inner column 4, downwardly. On the other hand, the rear support member 42 is positioned on an extended line of the slit 31 and also formed so as to extend 9 from the lower marginal portion forming the outer circumferential part of the inner column 4, downwardly. That is, the movable-side friction plate 53*b* is arranged on the side of the inner column 4 through the front support member 41 and the rear support member 42. Additionally, the dimension of the impact-absorbing slot 53*c* along the cylinder-axis direction is set so as to overlap the whole area of the adjustable range of the telescopic position established by the engagement slot 34 and also become broader than the adjustable range of the telescopic position.

Next, the assembling sequence of the steering column device 1 of this embodiment will be described. First, it is carried out to insert the inner column 4 into the cylinder of the outer column 3 while inserting the front support member 41 of the inner column 4 into the slit 31 of the outer column 3. A resinous collar 3*a* is interposed between the outer column 3 and the inner column 4. The resinous collar 3*a* is locked to the inner face of the outer column 3 in advance.

Subsequently, it is carried out to dispose the outer column 3 between the pair of hanging parts 22 of the attachment bracket 2. Using a suspension spring 14, it is then performed to allow the attachment bracket 2 to suspend the outer column 3 while allowing the pivot part 23 of the attachment bracket 2 to support the pivot receiving part 30 of the outer column 3.

Further, it is performed to laminate the movable-side friction plates 53b and the stationary-side friction plates 53a on each other thereby assembling the frictional lock mechanism 53 and further arrange the assembled frictional lock mechanism 53 between the pair of clamp parts 32. Subsequently, it is performed to assemble the operating shaft 51 to the attachment bracket 2 and the outer column 3 while allowing the operating shaft 51 to penetrate through frictional lock mechanism 53. The operating shaft 51 penetrates through the tilt slot 24 of the right-side hanging part 22R, the right-side clamp part 32R, the frictional lock mechanism 53 (the impact absorbing slot 53c of the movable-side friction plate 53b), the left-side clamp part 32L and the tilt slot 24 of the left-side hanging part 22L, in this order. Additionally, the cam mechanism 52 and the operating lever 54 are assembled to the outside of the left-side hanging part 22L. Then, respective nuts are thread engaged with the ends of the operating shaft 51 and subsequently fastened so as to produce an axial force required at locking.

Next, under condition of disposing the front short-side frame part 53d of the movable-side friction plate 53b on the front support member 41, it is performed to dispose the rear short-side frame part 53e of the movable-side friction plate 53b on the rear support member 42 and further fix the rear support member 42 to the rear short-side frame part 53e by the support pin 33b. Then, the upper shaft 11U having the lower shaft 11L spline-connected thereto is inserted into the outer column 3 from the front side. Further, the lower shaft 11L is supported by the outer bearing 12 so as to be rotatable in the cylindrical outer column 3, while the upper shaft 11U is supported by the inner bearing 13 so as to be rotatable in the cylindrical inner column 4.

Next, the operating sequence of the steering column device 1 of this embodiment will be described. In order to fix the inner column 4 in a desired position, it is performed to move the inner column 4 in the tilt direction (vehicle vertical direction) and in the telescopic direction (vehicle longitudinal direction), thereby swinging the operating lever 54 upwardly. Next, when operating to swing the operating lever 5 upwardly, the rotational cam 52b of the cam mechanism 52 provided integrally with the operating lever 54 is rotated, so that the crest parts of the stationary cam 52a and the crest parts of the rotational cam 52b overlaps each other. As a result, the dimension of the cam mechanism 52 in the direction of the operating shaft is increased, so that the operating shaft 51 is pulled to the left side in FIG. 5. With the operating shaft 51 pulled to the left side, the interval between the pair of hanging parts 22 and the dimension between the pair of clamp parts 32 are narrowed to reduce the diameter of the outer column 3 Then, with this reduction in the diameter of the outer column 3, the inner circumferential face of the outer column 3 is brought into pressure contact with the outer circumferential face of the inner column 4.

In the frictional lock mechanism 53, additionally, the step part 51a of the operating shaft 51 moves toward the left-side clamp part 32L (the other clamp part) since the operating shaft 51 is pulled to the left side in FIG. 5. Consequently, between the step part 51a and the inner face of the left-side clamp part 32L, the movable-side friction plates 53b and the stationary-side friction plates 53a are brought into pressure contact with each other.

Since the inner circumferential face of the outer column 3 is brought into pressure contact with the outer circumferential face of the inner column 4 and furthermore, the movable-side friction plates 53b are brought into contact with the stationary-side friction plates 53a to be held, the inner column 4 is fastened to the outer column 3.

In order to adjust the position of the inner column 4, the fastening state between the inner column 4 and the outer column 3 is cancelled. For this purpose, it is first performed to swing the operating lever 54 downward. By operating to swing the operating lever 54 downward, the rotational cam 52b of the cam mechanism 52 provided integrally with the operating lever 54 is rotated, so that the crest parts of the stationary cam 52a and the trough parts of the rotational cam 52b overlaps each other. Thus, the dimension of the cam mechanism 52 in the direction of the operating shaft is shrunk, so that the operating shaft 51 is loosened. Consequently, the outer column 3 is elastically restored to expand the interval between the pair of clamp parts 32, so that the fastening state between the inner circumferential face of the outer column 3 and the outer circumferential face of the inner column 4 is cancelled.

Additionally, as the operating shaft 51 is pulled to the right side in FIG. 5 since the operating shaft 51 is loosened to cause an elastic restoration of the pair of clamp parts 32 of the outer column 3, the pressure contact between the movable-side friction plate 53b and the stationary-side friction plate 53a is cancelled in the frictional lock mechanism 53 and additionally, a clearance between the movable-side friction plate 53b and the stationary-side friction plate 53a is ensured.

Since the movable-side friction plate 53b departs from the stationary-side friction plate 53a with the cancellation of the pressure contact between the inner circumferential face of the outer column 3 and the outer circumferential face of the inner column 4, the adjustment in the position of the inner column 4 in both the tilt direction and the telescopic direction can be carried out with ease.

Under condition that the inner column 4 is fastened to the outer column 3 with the fastening operation of the operating lever 54, if an impact load exceeding a set value is applied to the inner column 4, it slides forward along the cylinder-axis direction in opposition to the frictional force produced between the stationary-side friction plate 53a and the movable-side friction plate 53b. Then, the impact energy is absorbed by the frictional force produced between the inner circumferential face of the outer column 3 and the outer circumferential face of the inner column 4 and the frictional force produced between the stationary-side friction plate 53a and the movable-side friction plate 53b.

According to the above-mentioned embodiment, by fastening the inner column 4 to the outer column 3 owing to the frictional force and also providing the frictional lock mechanism 53 absorbing the impact energy, it is possible to absorb impact energy from a time immediately after an impact is applied to the inner column, without producing a free running zone.

As the frictional force between the outer column 3 and the inner column 4 can be easily increased owing to the provision of the frictional lock mechanism 53, it is possible to fasten the inner column 4 to the outer column 3 with a small operating force.

Further, when cancelling the fastening state, the outer column 3 is elastically restored to expand the interval between the pair of clamp parts 32 and simultaneously, the clearance between the movable-side friction plate 53b and the stationary-side friction plate 53a is ensured. As a result, it is possible to suppress the frictional resistance which would be produced when the fastening state is cancelled to execute the adjustment of the telescopic position, thereby allowing superior operability to be exhibited. Additionally, as there is no need of providing means for urging the operating shaft 51 to the direction to cancel the fastening state (to the right side in FIG. 5) separately, it is possible to reduce the number of components.

Since the slit 31 extends to an outer column's part corresponding to the front end of the inner column 4 under condition that the inner column 4 is shrunk to the utmost extent after absorbing impact energy, it is possible to contract the diameter of the outer column 3 by a small operating force while allowing the outer column 3 to have enough rigidity for the movement of the inner column 4 in the cylinder-axis direction.

Owing to the provision of the engagement slot 34 and the stopper 34a, while adjusting the position of the inner column 4 within the adjustment range of the telescopic position during the normal state, the impact energy can be absorbed by the fracture of the stopper 34a at the impact absorption.

Incidentally, in case of setting a nonconductive member, such as a resinous collar, between the outer column 3 and the inner column 4, a path leading to the inner column 4, the movable-side friction plate 53b, the stationary-side friction plate 53a and the outer column 3 in sequence can be utilized as an energizing path that constitutes an electric circuit of electric components (not shown) arranged around the steering column device 1.

According to the steering column device 1 of this embodiment, the outer column 3 is provided with the engagement slot 34, while the inner column 4 is provided with the stopper 34a. In another embodiment nevertheless, even when the inner column 4 is provided with the engagement slot 34 while the outer column 3 is provided with the stopper 34a, similar effects to those of this embodiment can be obtained.

What is claimed is:

1. A steering column device comprising:
an outer column having a cylindrical shape and arranged along a vehicle longitudinal direction;
a slit formed to penetrate through a cylindrical wall of the outer column along a cylinder-axis direction of the outer column;
first and second clamp parts arranged on both edge parts of the slit along the cylinder-axis direction;
an inner column having a cylindrical shape and inserted into the outer column so as to be movable in the cylinder-axis direction;
an operating shaft having a shaft-shape and arranged so as to penetrate through the first and second clamp parts while engaging one end of the operating shaft with an outer face of the first clamp part, the operating shaft comprising a large-diameter shaft portion positioned on the side of the first clamp part, a small-diameter shaft portion having a diameter smaller than a diameter of the large-diameter shaft portion and positioned on the side of the second clamp part and a step part interposed between the large-diameter shaft portion and the small-diameter shaft portion and arranged between the first clamp part and the second clamp part;
an operating lever arranged on a shaft portion of the operating shaft positioned on the side of an outer face of the second clamp part;
cam mechanism that allows a dimension thereof in the direction of the operating shaft to be increased by rotating the operating shaft about an axis thereof to a fastening direction, thereby reducing an interval between the first clamp part and the second clamp part, contracting the diameter of the outer column and bringing the outer column into pressure contact with the inner column; and
frictional lock mechanism having a laminated body in which a movable-side friction plate including a plate member having an impact absorbing slot opening along the cylinder-axis direction and arranged on the side of the inner column and a stationary-side friction plate including a plate member and arranged on the side of the outer column are laminated on each other, the impact absorbing slot being penetrated by the small-diameter shaft portion of the operating shaft along the laminating direction, wherein, between the step part and the second clamp part, the movable-side friction plate is brought into pressure contact with the stationary-side friction plate to be held since the dimension of the cam mechanism in the direction of the operating shaft is increased to move the operating shaft toward the cam mechanism, and when a load exceeding a set value is applied to the inner column under condition that the movable-side friction plate is brought into pressure contact with the stationary-side friction plate to be held, the movable-side friction plate slides on the stationary-side friction plate, thereby absorbing impact energy.

2. The steering column device of claim 1 wherein the slit is formed so as to extend from a rear edge of the outer column up to an outer column's part corresponding to the front end of the inner column, which has been inserted into the outer column through a rear end thereof, under condition that the inner column is shrunk to the utmost extent after absorbing impact energy.

3. The steering column device of claim 1 wherein one of the outer column and the inner column is provided with an engagement slot whose longitudinal dimension is set smaller than the longitudinal dimension of the impact absorbing slot, and
the other of the outer column and the inner column is provided with a stopper which is inserted and fitted to the engagement slot movably in a longitudinal direction thereof and which is established so as to fracture when a shear load exceeding a set value is applied to the stopper.

* * * * *